US007660256B2

(12) United States Patent
Nagami et al.

(10) Patent No.: US 7,660,256 B2
(45) Date of Patent: Feb. 9, 2010

(54) SYSTEM AND METHOD FOR MONITORING LABEL SWITCHED PATH IN NETWORK

(75) Inventors: Kenichi Nagami, Tokyo (JP); Ikuo Nakagawa, Tokyo (JP)

(73) Assignee: Cloud Scope Technologies, Inc., Tokyo (JP)

(*) Notice: Subject to any disclaimer, the term of this patent is extended or adjusted under 35 U.S.C. 154(b) by 739 days.

(21) Appl. No.: 11/092,599

(22) Filed: Mar. 29, 2005

(65) Prior Publication Data

US 2005/0220030 A1    Oct. 6, 2005

(30) Foreign Application Priority Data

Mar. 30, 2004 (JP) ............................. 2004-099696

(51) Int. Cl.
*G01R 31/08* (2006.01)
*G06F 11/00* (2006.01)
*H04L 12/28* (2006.01)
*H04J 3/18* (2006.01)

(52) U.S. Cl. ................... 370/241; 370/248; 370/256; 370/477

(58) Field of Classification Search ............. 370/241, 370/248, 256, 477
See application file for complete search history.

(56) References Cited

U.S. PATENT DOCUMENTS

| 6,570,867 | B1  |   | 5/2003  | Robinson et al. |         |
|-----------|-----|---|---------|-----------------|---------|
| 7,035,259 | B2  | * | 4/2006  | Nomura et al.   | 370/392 |
| 2003/0135645 | A1 | * | 7/2003  | Oki et al.      | 709/238 |
| 2003/0165114 | A1 | * | 9/2003  | Kusama et al.   | 370/216 |
| 2004/0047349 | A1 | * | 3/2004  | Fujita et al.   | 370/389 |
| 2004/0184483 | A1 | * | 9/2004  | Okamura et al.  | 370/477 |
| 2006/0168208 | A1 | * | 7/2006  | Nagami          | 709/224 |
| 2007/0177523 | A1 | * | 8/2007  | Nagami et al.   | 370/252 |
| 2007/0280242 | A1 | * | 12/2007 | Rajagopalan et al. | 370/392 |
| 2008/0151783 | A1 | * | 6/2008  | Bamba           | 370/254 |

FOREIGN PATENT DOCUMENTS

| JP | 2000-324137 A | 11/2000 |
| JP | 2002-111666 A |  4/2002 |
| JP | 2003-318955 A | 11/2003 |

OTHER PUBLICATIONS

"IP/MPLSView", Product Brochure of WANDL, Inc., Dec. 2002, New Jersey.
Yamaguchi, Isao, "Realization of Integrated Monitoring of Digital Switching System (DSW)", NTT Technical Journal, vol. 5, No. 6.

* cited by examiner

*Primary Examiner*—Chi H Pham
*Assistant Examiner*—Farah Faroul
(74) *Attorney, Agent, or Firm*—Birch, Stewart, Kolasch & Birch, LLP.

(57) ABSTRACT

Systems and methods for providing a network monitoring tool for appropriately grasping a setup state of a label switched path (LSP) in a network. A monitoring apparatus comprises a communication unit that communicates with a router among a plurality of routers in the network, and a collection unit that collects LSP path information via the communication unit. The LSP path information includes information maintained by the router. The monitoring apparatus also comprises a storing unit that stores state information based on the collected LSP path information, and a display unit that reads the state information for a selected LSP stored by the storing unit and graphically displays a path of the selected LSP, in accordance with a user's instruction.

21 Claims, 12 Drawing Sheets

| ENTRY NUMBER | INGRESS ROUTER | EGRESS ROUTER | LSP IDENTIFIER | LSP NAME | PATH (LABEL) | STATE | TYPE | OTHER LSP INFORMATION |
|---|---|---|---|---|---|---|---|---|
| 1 | R1 | R4 | 500 | TOKYO-OSAKA | R1 (100)→R2 (102)→ R3 (3)→R4 | UP | PRIMARY (SECONDARY=2) | |
| 2 | R1 | R4 | 600 | TOKYO-OSAKA2 | R1 (200)→R6 (201)→ R5 (3)→R4 | UP | SECONDARY (PRIMARY=1) | |
| 3 | R1 | R3 | 550 | TOKYO-NAGOYA | R1→R6→× | DOWN | | |

FIG. 3

| ENTRY NUMBER | TIME | INGRESS ROUTER | EGRESS ROUTER | LSP IDENTIFIER | LSP NAME | PATH(LABEL) | STATE | TYPE | OTHER LSP INFORMATION |
|---|---|---|---|---|---|---|---|---|---|
| 1 | 2004/1/2 10:15:21 | R1 | R4 | 500 | TOKYO-OSAKA | R1(100)→R2(102)→ R3(3)→× | DOWN | PRIMARY | |
| 2 | 2004/1/2 10:15:25 | R1 | R4 | 600 | TOKYO-OSAKA2 | R1(200)→R9(209)→ R5(3)→R4 | UP | SECONDARY | |
| | | | | | | | | | |

| ENTRY NUMBER | INGRESS ROUTER | EGRESS ROUTER | LSP IDENTIFIER | LSP NAME | PATH (LABEL) | STATE | TYPE | LOCAL REPAIR LSP | MAIN LSP | OTHER LSP INFORMATION |
|---|---|---|---|---|---|---|---|---|---|---|
| 1 | R1 | R4 | 500 | TOKYO-OSAKA | R1 (100)→R2 (102)→ R3 (3)→R4 | UP | PRIMARY (SECONDARY=2) | R2:4 R3:5 | | R2:USING LOCAL_REPAIR_LSP |
| 4 | R2 | R3 | 710 | BACKUP | R2 (200)→R6 (3)→R3 | UP | LOCAL_REPAIR_LSP | | 1 | |
| 5 | R3 | R4 | 840 | BACKUP | R3 (201)→R5 (3)→R4 | up | LOCAL_REPAIR_LSP | | 1 | |

| ENTRY NUMBER | INGRESS ROUTER | EGRESS ROUTER | LSP IDENTIFIER | LSP NAME | PATH(LABEL) | STATE | TYPE | TRANSIT LSP | OTHER LSP INFORMATION |
|---|---|---|---|---|---|---|---|---|---|
| 1 | R4 | R6 | 500 | TOKYO-OSAKA | R4(100)→R5(3)→R6 | UP | PRIMARY (SECONDARY=2) | 3 4 5 | |
| 2 | R4 | R6 | 600 | TOKYO-OSAKA2 | R4(200)→R8(3)→R6 | UP | SECONDARY (PRIMARY=1) | | |
| 3 | R1 | R2 | 320 | KOCHI-SAPPORO | R1(101)→↑<br>R4(200:*LSP1*)→R6(3)<br>→R2 | up | PRIMARY | | |
| 4 | R3 | R7 | 460 | HAKATA-SENDAI | R3(300)→↑<br>R4(201:*LSP1*)→R6(3)<br>→R7 | up | PRIMARY | | |
| 5 | — | R7 | 1100 | — | R3(200)→↑↑<br>R9(300)→↑↑<br>R4(203:*LSP1*)→R6(3)<br>→R7 | up | | | |

*FIG. 11*

SYSTEM AND METHOD FOR MONITORING LABEL SWITCHED PATH IN NETWORK

BACKGROUND OF THE INVENTION

1. Field of the Invention

The present invention relates to a system for monitoring a label switched path (LSP) set up in a network in which packet forwarding is done by MPLS (Multiprotocol Label Switching) method.

2. Background

MPLS is a technology for speeding up packet forwarding in the Internet. In the technology, a router does not determine a forwarding destination of a packet by looking up the address in the network layer of the packet, but does fast switching with a label put on a packet. In a network adopting this technology, an LSP is set up by an exchange of a message of the RSVP (Resource ReSerVation Protocol), the LDP (Label Distribution Protocol), or the like between an ingress router and an egress router or between neighboring routers on a path from an ingress point to an egress point.

For a manager of an internet service provider (ISP) which operates a network that adopts this MPLS method, a tool that visualizes what LSP is set up in the network would be useful. For example, a US company WANDL provides a visualization tool called "IP/MPLSView". This visualization tool of WANDL infers and displays an LSP to be set up, by collecting configuration information from each router in a network and simulating the behavior of various protocols between routers based on the collected configuration information. For this reason, the visualization tool of WANDL cannot visualize an LSP that is actually set up.

On the other hand, an art is proposed in which, when there is a trouble in an LSP, it is determined where in the LSP the trouble occurred (Japanese Patent Laid-Open Application No. 2002-111666). In this art, traffic at an ingress router of the LSP is measured and, when a trouble is detected, an LSP is found out to check where in the path the trouble occurred. Specifically, a path of an LSP is determined based on router information included in an LDP message that was exchanged to set up the LSP, in which a loop detection mode was used. Thereafter, traffic that flows between routers on the determined path is observed to identify the cause of the trouble.

Even in the above art, however, an LSP is found out only when traffic is sent through the LSP, and thus an LSP that is actually setup cannot be found. This is because there is sometime passage after an LSP was set up by a message exchange till traffic is actually sent through the LSP and because a path cannot be searched for unless traffic flows in the above art since its purpose is to monitor troubles.

For example, in a case where a manager of an ISP, in order to do construction on an LSP, uses another alternative LSP, the manager would want to carry out the steps of conducting various checks about a setup of the alternative LSP and then switching traffic which has been sent through the original LSP to the alternative LSP. In the above art, however, since no traffic flows through the alternative LSP before switching, the alternative LSP cannot be searched for. That is, in the conventional art, a user (a manager of an ISP in the above example) cannot check what path an alternative LSP actually passes through, or a current state (whether the path is connected (UP) or disconnected (DOWN)), or the like before the LSP to send traffic is switched.

Additionally, in the above art, when a trouble occurs in which an LSP is disconnected, the trouble is detected by measuring traffic that flows through the LSP. So, when an LSP with no traffic flow becomes disconnected, this cannot be found until traffic flows. However, it is desirable that a manager of an ISP can immediately find that an LSP becomes disconnected and take measures before traffic flows.

SUMMARY OF THE INVENTION

Systems and methods consistent with the invention may provide a network monitoring tool that can appropriately grasp a setup state of an LSP in a network. In MPLS, various types of LSPs can be set up, such as a global repair LSP (a secondary LSP for a primary LSP), a local repair LSP (a detour LSP for part of a main LSP), a hierarchical LSP (also called a label stack whereby a lower-level LSP, 'thin pipe,' is set up so that it passes through a higher-level LSP, 'thick pipe'), etc. A label put on a packet according to MPLS can be used, not only for switching the packet to a next router at an intermediate router of the LSP, but also for selecting a network-layer routing table at an egress router of the LSP in a case where the egress router has a plurality of routing tables for customers. The realization of a tool that clearly visualizes these LSPs would be a help for ISP managers who manage many LSPs.

Systems and methods consistent with the invention may provide an apparatus for monitoring a network in which a label switched path (LSP) can be set up and a plurality of routers are included. The apparatus comprises: a communication unit that communicates with a router among the plurality of routers; a collection unit that collects LSP path information via the communication unit; a storing unit that stores state information based on the LSP path information collected by the collection unit; and a display unit that reads the state information for a selected LSP stored by the storing unit and graphically displays a path of the selected LSP, in accordance with a user's instruction. The LSP path information includes information maintained by the router, and the state information includes information for identifying an LSP and information on a current path of the LSP.

As described hereafter, other aspects of the invention exist. Thus, this summary of the invention is intended to provide a few aspects of the invention and is not intended to limit the scope of the invention described and claimed herein.

BRIEF DESCRIPTION OF THE DRAWINGS

The accompanying drawings are incorporated in and constitute a part of this specification. The drawings exemplify certain aspects of the invention and, together with the description, serve to explain some principles of the invention.

FIG. 3 shows an example of information to be stored in an LSP state storage section 170 of the monitoring apparatus 100;

FIG. 5 shows an example of information stored in an LSP history storage section 185 of the monitoring apparatus 100;

FIG. 9 shows another example of information to be stored in the LSP state storage section 170 of the monitoring apparatus 100;

FIG. 11 shows still another example of information to be stored in the LSP state storage section 170 of the monitoring apparatus 100.

DETAILED DESCRIPTION

Figure 1:
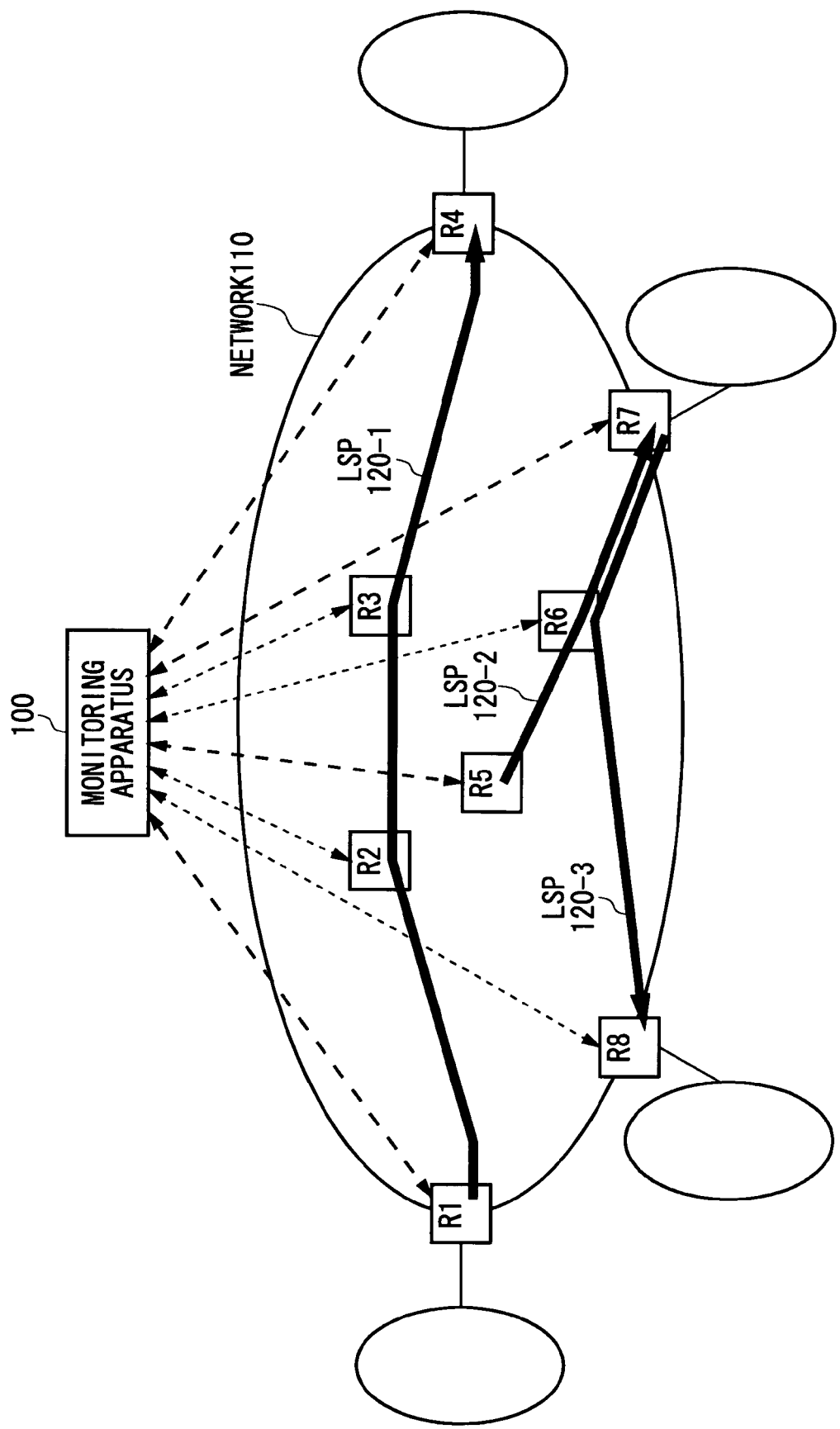
FIG. 1 shows an example of a network configuration to which an embodiment of the invention can be applied.

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention. Instead, the scope of the invention is defined by the appended claims.

General Description

An example of a monitoring apparatus consistent with the invention comprises: a communication unit that communicates with a router among the plurality of routers; a collection unit that collects LSP path information via the communication unit; a storing unit that stores state information based on the LSP path information collected by the collection unit; and a display unit that reads the state information for a selected LSP stored by the storing unit and graphically displays a path of the selected LSP, in accordance with a user's instruction.

The LSP path information includes information maintained by the router, and the state information includes information for identifying an LSP and information on a current path of the LSP. The information on the current path of the LSP may include at least one of ingress router information, egress router information, intermediate router information, and label information, wherein each router is located on the current path. The LSP path information and the state information may, but do not have to, include information on a current state (e.g., connected or disconnected) of the LSP.

In this configuration, by collecting to the monitoring apparatus information about paths (current states of those paths may be included) that routers have, the routers doing packet forwarding actually using LSPs, a current setup state of each LSP can be grasped and can be clearly shown to a user along with a path of each LSP. That is, since each router changes a path of each LSP in response to an event that actually occurs in a network (e.g. a trouble), an actual state of each LSP, which cannot be caught by a theoretical simulation using configuration information of routers, can be grasped by the monitoring apparatus collecting LSP information directly from each router. In addition, since LSP information can be collected from each router independently of packet forwarding that uses an LSP, it can be found whether the LSP is actually set up or not, how the path is, whether the state is UP or DOWN, or the like, even before traffic is sent.

In the above configuration, the collection unit may receive a notification via the communication unit, wherein the notification indicates a change in the LSP path information maintained by the router and is transmitted by the router. In this case, a function is provided on each router side to independently inform the monitoring apparatus that there is a change in LSP information, and thus the monitoring apparatus can grasp an updated LSP setup state more quickly. Alternatively or additionally, if the collection unit includes a unit of requesting each router on a regular basis to send LSP information and receiving LSP information sent from each router in response to the request, an LSP setup state can be updated appropriately even when change notifications do not reach the monitoring apparatus from each router for some reasons.

In the above configuration, the apparatus may further comprise a second storing unit that stores history information with time information, wherein the history information is state information having been stored by the storing unit before. Then, the display unit may graphically display a path of a selected LSP at a selected time past, based on the history information stored by the second storing unit, in accordance with a user's instruction concerning the selected time. In this case, a setup state of each LSP at an instructed time point in the past can be clearly shown to a user.

In the above configuration, a plurality of LSPs with different paths may be able to be set up from an ingress router to an egress router in the network, and the collection unit may collect further information from the ingress router having the plurality of LSPs to the egress router, wherein said further information indicates a correspondence between one of the plurality of LSPs of one type and another of the plurality of LSPs of another type. The storing unit may store state information such that the state information for said one of the plurality of LSPs can be found when said another of the plurality of LSPs is designated, and the display unit may search the state information stored by the storing unit to graphically display the different paths regarding the plurality of LSPs in association with each other. In this case, a correspondence between a primary LSP and a secondary LSP (backup LSP) whose start point and end point are the same can be clearly shown to a user, in a network in which a global repair LSP can be set up, for example.

In the above configuration, a detour LSP from one router to another router may be able to be set up in the network, wherein said one router and said another router are on a path of an LSP other than the detour LSP itself. The collection unit may collect further information for specifying a main LSP, for which the detour LSP can be used, and the storing unit may store state information such that the state information for one of the main LSP and the detour LSP can be found when another of the main LSP and the detour LSP is designated. The display unit may search the state information stored by the storing unit to graphically display a path of the main LSP and a path of the detour LSP in association with each other. In this case, for example, in a network in which a local repair LSP (detour LSP for part of a main LSP) can be set up, a correspondence between a main LSP from start to end and a detour LSP for part of the main LSP for local repair, a detour LSP actually used among one or more existing detour LSPs, or the like can be clearly shown to a user.

In the above configuration, a lower-level LSP from an ingress router to an egress router may be able to be set up using a higher-level LSP in the network, wherein the higher-level LSP is established between routers on a path of the lower-level LSP. The collection unit may collect further information for specifying the higher-level LSP used by the lower-level LSP, and the storing unit may store state information such that the state information for one of the higher-level LSP and the lower-level LSP can be found when another of the higher-level LSP and the lower-level LSP is designated. The display unit may search the state information stored by the storing unit to graphically display a path of the higher-level LSP and a path of the lower-level LSP in association with each other. In this case, for example, in a network in which a hierarchical LSP (label stack) can be set up, a lower-level LSP, which is set up so that it passes through a higher-level LSP, can be clearly shown to a user so that the user can easily identify an affected lower-level LSP when a trouble occurs in a higher-level LSP.

In the above configuration, the collection unit may collect LSP path information for an LSP (a current state of the path may be included), from an ingress router of the LSP. That is, if a message exchanged for setting up an LSP, for example, is of the RSVP exchanged between an ingress router and an egress router, LSP information including information on respective routers on a path of the LSP is stored in an ingress router, and thus all the information on the LSP may be collected from the ingress router of the LSP.

However, there is a case where LSP information stored in an ingress router has a bug and the information is not updated with an actually set state of an LSP. In order to cope with this bug, in the above configuration, the apparatus may further comprise: a second collection unit that collects further information for the LSP, from each router on a path of the LSP, via the communication unit; and a unit that determines information on a current path of the LSP to be stored by the storing unit, through correcting the LSP path information collected by the collection unit based on said further information collected by the second collection unit. In this case, by additionally collecting information from an intermediate router and/or an egress router of an LSP, LSP information collected from an ingress router of the LSP can be corrected so that an actual LSP state is indicated more accurately.

In the above configuration, the apparatus may further comprise a traffic information collection unit that collects further information indicating traffic forwarded through an LSP, from a router, via the communication unit, wherein the display unit graphically displays the traffic of a selected LSP in association with the path of the selected LSP. This allows a user to grasp a setup state of an LSP, along with information on traffic when the traffic flows through the LSP that has been set up.

An example of a method consistent with the invention comprises: collecting LSP path information through communicating with a router among the plurality of routers; storing state information in a memory based on the LSP path information collected; and reading the state information for a selected LSP from the memory to graphically display a path of the selected LSP, in accordance with a user's instruction.

An example of a system consistent with the invention comprises: a plurality of routers included in the network; and a monitoring apparatus that can communicate with the plurality of routers, wherein each of the plurality of routers includes: a first storing unit that stores LSP path information; and a transmitting unit that transmits information stored by the first storing unit to the monitoring apparatus, and the monitoring apparatus includes: a receiving unit that receives information transmitted by said each of the plurality of routers; a second storing unit that stores state information based on the information received by the receiving unit; and a display unit that reads the state information for a selected LSP stored by the storing unit and graphically displays a path of the selected LSP, in accordance with a user's instruction.

The above apparatus and method may be realized by a program that makes a computer function as the monitoring apparatus of the above configuration. Another program may be installed in each router so that each router and the monitoring apparatus form the network monitoring system.

As described above, systems and methods consistent with the invention can allow an LSP setup state in a network to be grasped appropriately by a monitoring apparatus and to be clearly shown to a user.

Description with Reference to Drawings

Exemplary embodiments of the above-described configuration will be described below with reference to the drawings.

FIG. 1 illustrates an exemplary configuration of a network to which the above apparatus can be connected. A network 110, in which an LSP 120 can be set up, is operated by one ISP in this example, but similar monitoring can also be performed in a case where the network 110 is divided into a plurality of networks each of which is operated by ISPs different from each other. There are many routers R in the network 110. R1, R4, R7, and R8 of the routers are border routers for severally connecting to external networks that belong to ISPs different from the network 110. In the example of FIG. 1, an LSP 120-1 whose ingress router is R1 and egress router is R4, an LSP 120-2 whose ingress router is internal R5 and egress router is R7, and an LSP 120-3 whose ingress router is R7 and egress router is R8 are set up. The routers R1 to R8 are called LSRs (Label Switching Routers). An ingress router and egress router of an LSP are sometimes called edge LSRs, and an intermediate router on a path is sometimes called a core LSR.

A monitoring apparatus 100 communicates with each of the routers R1 to R8 to collect information on each of the LSPs 120-1 to 120-3. The monitoring apparatus 100 here may collect LSP information from all of the routers, or may collect LSP information only from a router that can be an ingress router of an LSP (R1, R4, R5, and R7, in the example of FIG. 1). Based on collected LSP information, the monitoring apparatus 100 visualizes a setup state of each LSP in an area specified by a user, and shows the state to a user. For this purpose, the monitoring apparatus 100 may have a display, or a monitoring apparatus may be able to be connected with a plurality of user nodes (not shown) via a network to show the state on displays of the user nodes in accordance with a user's instruction from each user node. Though there is one monitoring apparatus in the example of FIG. 1, a plurality of monitoring apparatuses may be provided at a plurality of places in the network 110 so that information may be exchanged and shared between the monitoring apparatuses. In such a case, for example, a monitoring apparatus closest to a user node requesting a visualization service will show visualized information in accordance with a user's instruction.

Figure 2:
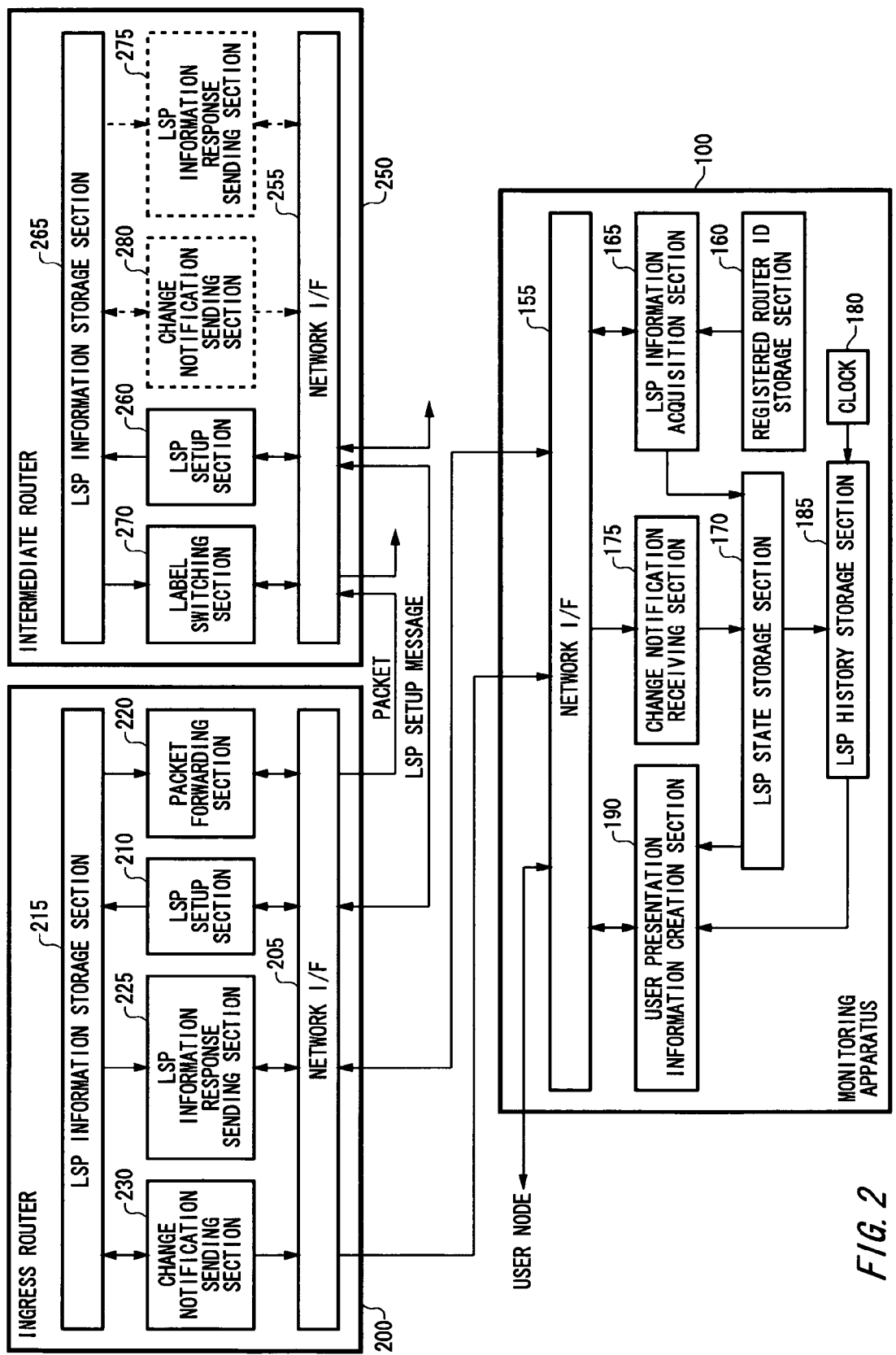
FIG. 2 shows an example of an internal configuration of a monitoring apparatus 100 and each router.

FIG. 2 shows internal configurations of each of the monitoring apparatus 100, a router 200 that can be an ingress router of an LSP, and an intermediate router 250 on an LSP. An egress router of an LSP may be configured to be similar to the intermediate router 250 except to have functions to be counterparts to an LSP setup section 210 and packet forwarding section 220 of the ingress router 200, instead of an LSP setup section 260 and label switching section 270 of the intermediate router 250. Each section of the device configurations shown in FIG. 2 may be realized by software, hardware, or combination of them.

The monitoring apparatus 100, ingress router 200, and intermediate router 250 in FIG. 2 comprise network I/Fs 155, 205, and 255, respectively, for communication. Only one network I/F is shown for each device in FIG. 2, but each device may also comprise a plurality of network I/Fs. Particularly, when each router performs packet forwarding (including packet forwarding by label switching), there are many cases where a packet is received via one network I/F and sent via another network I/F.

The LSP setup section 210 of the ingress router 200, the LSP setup section 260 of the intermediate router 250 that exchanges with the LSP setup section 210 a setup message such as of the RSVP, and an LSP information storage section 215 of the ingress router and LSP information storage section 265 of the intermediate router that store information on an LSP set up by the exchanged message can be the same as those a router that is a component of an MPLS-method network commonly has. In addition, the packet forwarding section 220 forwards a received packet in the network layer, referring to information that identifies a packet flow to be sent through the LSP (e.g. destination/source addresses of the network layer, a port number, etc.), the information being stored in the LSP information storage section 215, and referring to information on a label of the LSP; the label switching section 270 forwards a received packet by label switching (replacing a label put on the packet), referring to a correspondence between label information on the entry and label information on the exit, the correspondence being stored in the LSP information storage section 265; and both of the packet forwarding section 220 and the label switching section 270 can be the same as those of a common MPLS-method router.

The LSP information storage sections 215 and 265 store not only information referred to as above at the time of packet forwarding, but also various information about an LSP that is exchanged by a message of the RSVP etc. for setting up or maintaining the LSP. Particularly in a case where an LSP is set up by the RSVP, the LSP information storage section 215 of the ingress router may also store information on one or more intermediate routers and a label used at each intermediate router as a path of the LSP, and whether a connection to an egress router is up or down as a state of the LSP. In order to collect these pieces of information to the monitoring apparatus 100, the monitoring apparatus 100 comprises an LSP information acquisition section 165 and a change notification receiving section 175, and the ingress router 200 comprises an LSP information response sending section 225 and a change notification sending section 230, in this embodiment.

The LSP information acquisition section 165 polls each ingress router, using the SNMP (Simple Network Management Protocol), a CLI (Command Line Interface), the XML (Extensible Markup Language), or the like. As a result, the LSP information response sending section 225 of each ingress router sends to the monitoring apparatus 100 LSP information currently stored in the LSP information storage sections 215, so that LSP information is collected from each router to the LSP information acquisition section 165, and the collected information is stored in an LSP state storage section 170. IDs of routers to be polled are stored in a registered router ID storage section 160 in advance.

The change notification receiving section 175 receives event-driven information such as an SNMP trap, syslog, or the like that is sent from the change notification sending section 230 of each ingress router. That is, the change notification sending section 230 creates a change notification and sends it to the monitoring apparatus 100 when a change occurs in LSP information stored in the LSP information storage section 215, so that LSP information is collected from each router via the change notification receiving section 175. A change notification may include a setup of a new LSP, a change in a path or state of an existing LSP, deletion of an existing LSP, or the like. A change occurred in the LSP information storage section 215 is thus brought by the change notification receiving section 175 into contents stored in the LSP state storage section 170.

In a case where LSP information acquired by the LSP information acquisition section 165 is different from LSP information stored in the LSP state storage section 170, and in a case where LSP information including a change is received by the change notification receiving section 175, post-change LSP information is stored in the LSP state storage section 170. LSP information stored in the LSP state storage section 170 before a change is then stored in an LSP history storage section 185 as past LSP information in conjunction with time information from a clock 180. On the other hand, a user presentation information creation section 190 of the monitoring apparatus 100 may accept at any time from a user node an instruction on an LSP desired to be visualized. In accordance with the instruction, the user presentation information creation section 190 reads corresponding LSP information from the LSP state storage section 170 or from the LSP history storage section 185, and creates graphic information to be shown to a user.

In the above example, an LSP is stored in an ingress router. However, there may be a case where an LSP different from LSP information stored in an ingress router is actually set up due to a bug or the like in each router on a path. In order to verify that there is no bug like this, LSP information stored in the LSP information storage section 265 of an intermediate router and egress router on a path will be collected to the monitoring apparatus 100 by means of the LSP information response sending section 275 and the change notification sending section 280. The monitoring apparatus 100 compares, one by one, LSP information collected from each router on a path with information on the path, label, or the like collected from an ingress router so as to check whether they agree with each other or not. When verification like this is not required, there need not be the LSP information response sending section 275 and change notification sending section 280 of an intermediate router and egress router.

FIG. 3 shows an example of information stored in the LSP state storage section 170 of the monitoring apparatus 100. An LSP is uniquely identified in the network 110 (in the monitoring apparatus 100), for example, by a combination of an ingress router and an LSP identifier. In a case of an LSP set up by the RSVP, an ID defined as a tunnel ID corresponds to an LSP identifier. In a case of an LSP set up by the LDP, an FEC (Forwarding Equivalence Class) corresponds to an LSP identifier.

In the example of FIG. 3, the LSP state storage section 170 stores, for each LSP, LSP information such as an ingress router, an egress router, an LSP identifier, an LSP name (a name given by an ISP manager for convenience, such as "Tokyo-Osaka," for example), a path (routers from an ingress router to an egress router, which may include one or more intermediate routers), a label put on a packet that is forwarded through the LSP via each router on the path, an LSP state (UP/DOWN), and other LSP information (bandwidth information, an LSP parameter, etc.). Any one or combination of the above items of LSP information may be the LSP path information maintained by each router and the state information stored by the monitoring apparatus. For example, a mere combination of an ingress router, an egress router, and a label may be sufficient information on a current path of the LSP in a case where a label is merely used for selection of routing tables at the egress router. Also, the information on a current path of the LSP may be sufficient by itself as the state information stored by the monitoring apparatus. Each piece of LSP information is provided with an entry number for management in the monitoring apparatus 100, and information on the same LSP identified as above is managed with the same entry number.

In FIG. 3, a distinction whether an LSP is a primary one or a secondary (backup) one is stored as the type of each LSP.

Moreover, also stored is information on which LSP can be used as a secondary for one LSP if the one LSP is a primary LSP, and, conversely, if one LSP is a secondary LSP, information on which primary LSP the one LSP is set up for as a backup. In the example of FIG. 3, an LSP named "Tokyo-Osaka" (entry number=1) and an LSP named "Tokyo-Osaka2" (entry number=2) are identical in the ingress router (R1) and egress router (R4), and the two LSPs are in primary-to-secondary correspondence. In order to bring them into the correspondence, a secondary of the former LSP being the LSP of entry number=2 and a primary of the latter LSP being the LSP of entry number=1 are stored as the type of each LSP. Information showing the type of each LSP, in a case where a plurality of LSPs which are identical in ingress and egress routers are set up, is also collected from an ingress router of each LSP. An example is shown here in which one secondary is set up for one primary. Similarly, also in a case where a plurality of secondaries are set up for one primary, information is collected from an ingress router and the correspondence is stored.

Figure 4:
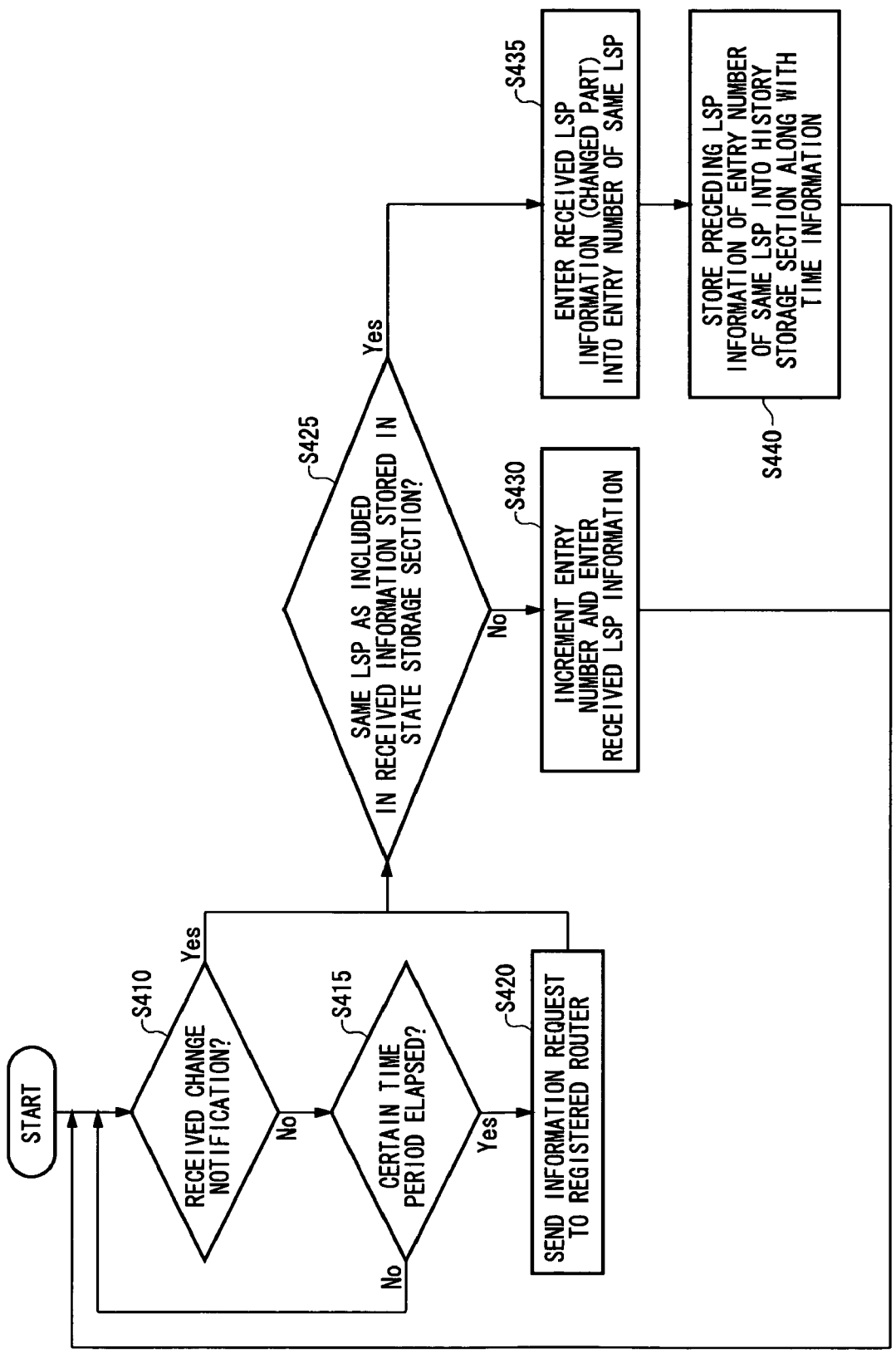
FIG. 4 shows an example of operation of the monitoring apparatus 100 to store an LSP state.

FIG. 4 shows an example of operation of the monitoring apparatus 100 for entering information like FIG. 3 into the LSP state storage section 170. First, at an initial stage when the monitoring apparatus starts operation, the apparatus sends a request to each of all routers stored in the registered router ID storage section 160, in order to acquire information on all LSPs that start from the routers (S420). Information can be acquired by the SNMP, CLI, XML, or the like. Acquired information is then entered into the LSP state storage section 170. Since the LSP state storage section 170 is still empty at this stage (S425 No), acquired LSP information is entered one by one with the entry number being automatically incremented so as to create a table as FIG. 3 (S430).

After the above operation is started, a change notification is to be sent from each router on an event-driven basis, so a change notification is received (S410 Yes). Acquired at this point is, as to a router that sent a change notification, information on a changed (newly set up, or the path or state changed or deleted) LSP that starts from the router. Information can be acquired by the SNMP trap, syslog, or the like. Acquired information is then entered into the LSP state storage section 170. At this time, it is examined whether a changed LSP is an LSP already stored in the LSP state storage section 170 or not (S425). Specifically, the table in FIG. 3 is searched using as a key, among pieces of received LSP information, information that can uniquely identify an LSP (e.g. a combination of an ingress router and an LSP identifier), and if there is a matched entry, it is judged that the same LSP is already stored. If there is not any matched entry (S425 No), changed LSP information is entered with the entry number being automatically incremented (S430). If there is a matched entry (S425 Yes), changed LSP information is entered into the section of the entry number of the matched entry (S435).

In addition, the current time may be entered into the LSP history storage section 185 in conjunction with information stored in the LSP state storage section 170 before change (S440). In this implementation, it is understood that the LSP information had been valid till the time entered into the LSP history storage section 185. As alternative implementation, when new or changed LSP information is entered into the LSP state storage section 170, the same LSP information can be entered into the history storage section 185 in conjunction with the current time (previously stored LSP information is not deleted in the history storage section 185). In this case, it is understood that the LSP information became valid at the time entered into the history storage section 185.

As shown in FIG. 4, an event notification can be done usually by receiving a change notification. In addition, polling will desirably be performed on a regular basis as insurance against a case where the event notification is lost before reaching the monitoring apparatus 100, or the like. In the example of FIG. 4, if a certain time period elapsed (S415 Yes), information is acquired from each router whose ID is stored in the registered router ID storage section 160 as is the case with the initial stage (S420), and if the acquired information is different from information stored in the LSP state storage section 170, the acquired information is entered into the state storage section 170 (S430 and S435). As with the above, the information may additionally be entered into the history storage section 185.

FIG. 5 shows an example of information stored in the LSP history storage section 185 of the monitoring apparatus 100. Stored times in the example of FIG. 5 are past times, and when compared with the current LSP setup state shown in FIG. 3, changes will be found in the following respects: at some time in the past, the "Tokyo-Osaka" LSP starting from the ingress router R1 had the same path as it has at the present time but was in a "DOWN" state; and the "Tokyo-Osaka2" LSP starting from the ingress router R1 had a different path than it has at the present time.

Figure 6:
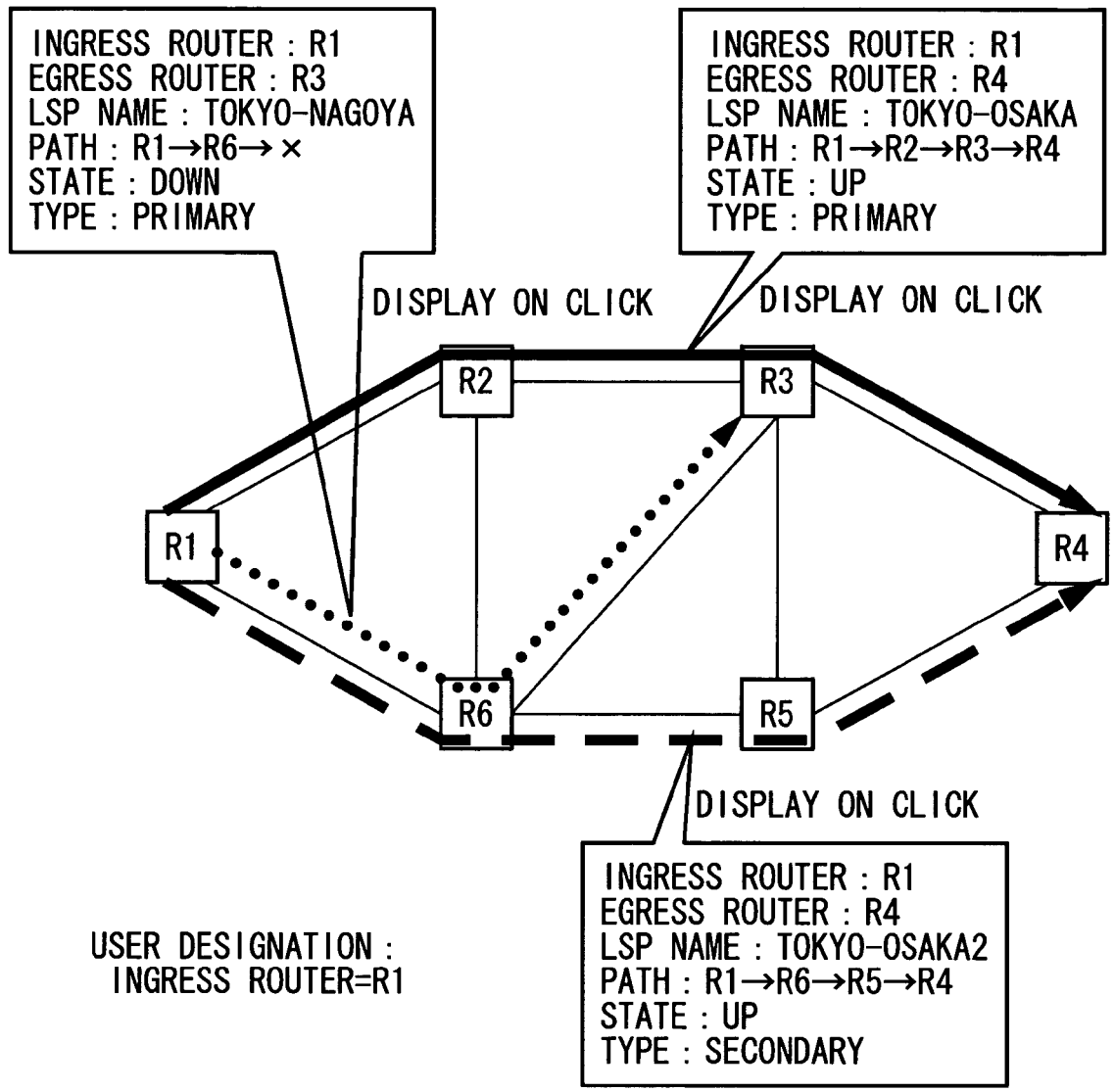
FIG. 6 shows an example of presentation of an LSP setup state by a user presentation information creation section 190.
Figure 7:
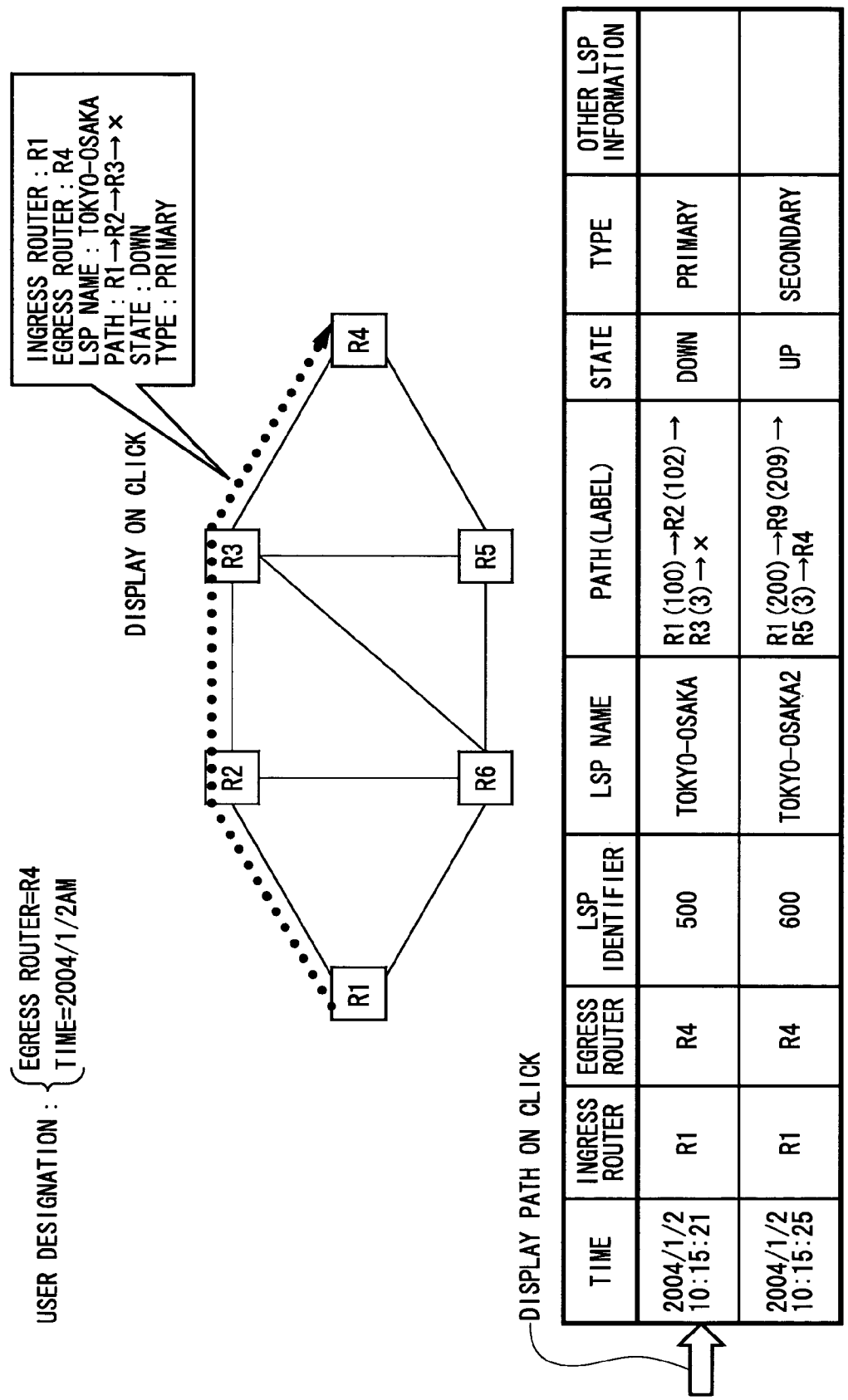
FIG. 7 shows an example of presentation of a past LSP state by the user presentation information creation section 190.
Figure 8:
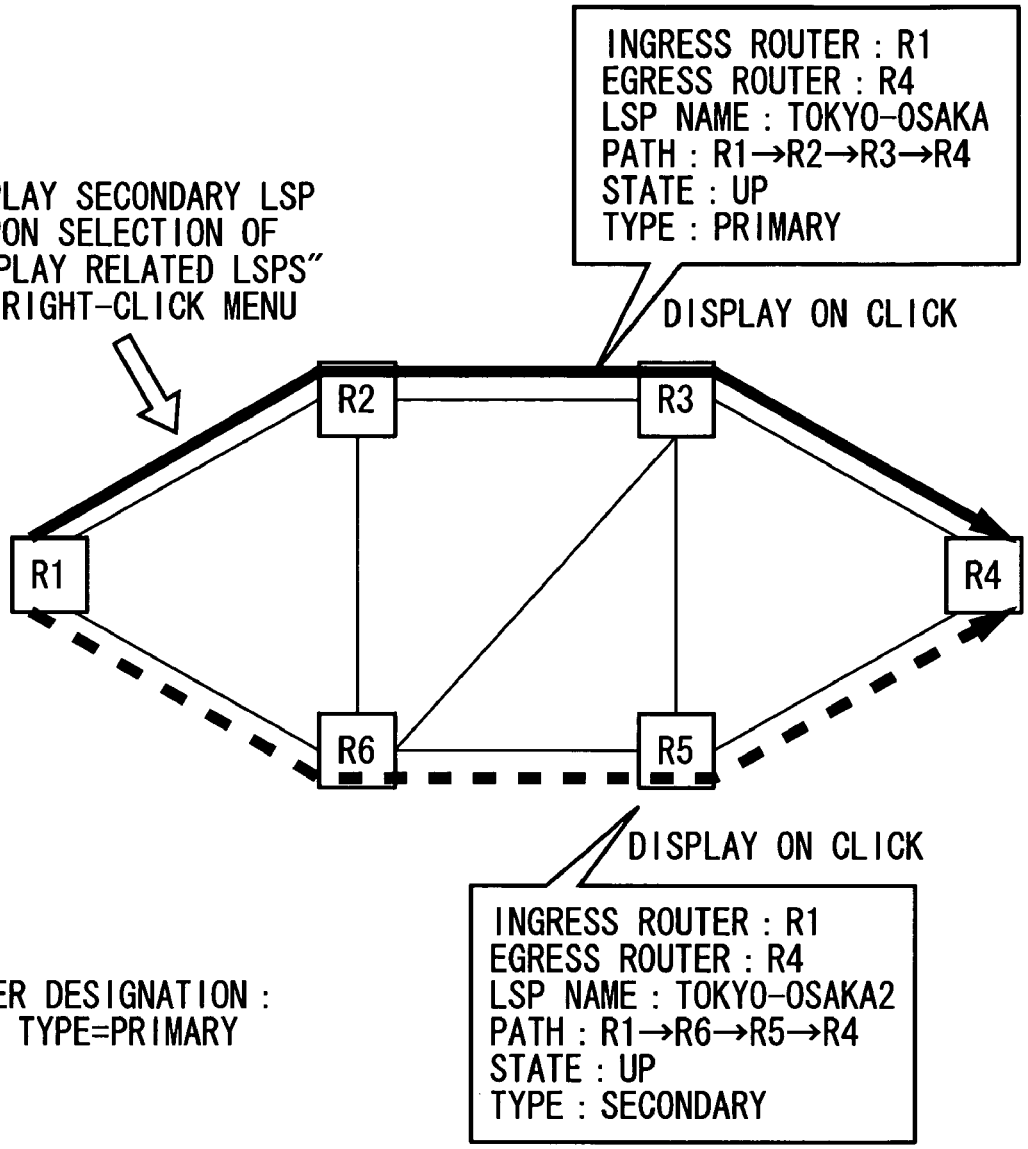
FIG. 8 shows an example of presentation of primary/secondary LSPs by the user presentation information creation section 190.

FIGS. 6 and 8 illustrate a GUI (Graphical User Interface) for information that is created by the user presentation information creation section 190 to be shown to a user when information like FIG. 3 is stored in the LSP state storage section 170. FIG. 7 illustrates a GUI for information that is created by the user presentation information creation section 190 to be shown to a user when information like FIG. 5 is stored in the LSP history storage section 185.

First, a process will be described in which a presentation such as FIGS. 6 to 8 is done based on information stored as FIGS. 3 and 5. Basically, when a user designates one or combination of items included in the table of the LSP state storage section 170 or of the LSP history storage section 185, an LSP that meets the user's requirement is displayed. For example, if a user designates a specific ingress router, the table of the state storage section 170 or of the history storage section 185 is searched using the designated ingress router as a key, and all LSP(s) that start from the designated router are displayed. If a user designates a specific ingress router and requires a display of LSPs that are in an UP state, the above table is searched using the ingress router and the state as keys. Similarly, if a specific egress router is designated, the above table is searched for LSPs ending at the designated egress router and the found LSP(s) are displayed, and if an LSP name is designated, the above table is searched for an LSP having the designated LSP name and the found LSP is displayed. If a transit router is designated, the above table is searched for LSPs that have the designated router in their paths and the found LSP(s) are displayed. If a transit link is designated, the operation will be as follows. A transit link can basically be specified by routers at both ends of the link and by interface numbers of the routers, and an interface number is represented by "IfIndex" used in the SNMP or by an address allocated for the interface. When a transit link is specified, the above table is searched for LSPs that have the specified transit link in their paths, and the found LSP(s) are displayed. In FIGS. 3 and 5, transit routers and labels therebetween are entered as a path, and when there are a plurality of links for an identical router, output interface numbers are entered into this label section as well as label values. In this way, when a transit link is designated, corresponding LSP(s) can be displayed by searching path information stored in FIG. 3 or 5.

FIG. 6 is a display example of a case where a user designates LSPs that start from R1 and corresponding LSPs are found in a table of the LSP state storage section 170. Network topology for a designated area may be displayed first; then a screen may be shown thereon in which found LSPs are displayed in bold arrows; and when each arrow is clicked or the like, detailed information on the arrow's LSP (information on a path, name, state, or the like) may be displayed in a popup (e.g., in text). Color or the like of an arrow indicating a path may be changed depending on the type or state of an LSP. In the example of FIG. 6, LSPs are shown as distinguished from one another as follows: a primary LSP is indicated by a solid-line arrow; a secondary LSP is indicated by a broken-line arrow; and an LSP in a DOWN state (the "Tokyo-Nagoya" LSP from R1 to R3) is indicated by circle-dotted-line arrow. If a user designates an LSP that starts from R1 and ends at R4 in the example of FIG. 6, only two LSPs of a solid-line arrow and broken-line arrow in FIG. 6 will be displayed.

FIG. 7 is a display example of a case where a mode of displaying a past LSP setup state is chosen by a user. In this mode, a user designates, for example, start date and time and end date and time, in addition to a condition designation such as the case with FIG. 6. In the example of FIG. 7, a user designation is made to LSPs ending at R4 so that events having occurred between start date and time (Jan. 2, 2004 0:00 a.m.) and end date and time (noon on the same day) are displayed. In accordance with this user designation, the LSP history storage section 185 is searched for LSPs that meet the requirement, and the found LSPs are displayed, for example, like a table at the bottom of FIG. 7. As shown at the top of FIG. 7, network topology for the designated area may previously be displayed, and when one of LSPs, listed in a table at the bottom of a screen as LSPs on which an event occurred during the designated period, is clicked or the like, the LSP may be displayed in a bold arrow (the indication style of the arrow may be different depending on the type or state, as described with FIG. 6) on the network topology at the top of the screen. For an alternative presentation example, LSPs on which an event occurred are not displayed in the form of a table but may be displayed with arrows on network topology from the outset, and when each arrow is clicked or the like, detailed information on the arrow's LSP (time information, and information on a path, state, or the like) may be displayed in a popup (e.g., in text).

FIG. 8 is a display example of a case where a user designates LSPs whose type is primary and the designated LSPs are found in a table of the LSP state storage section 170. Network topology for a designated area is displayed first, and a screen is shown thereon in which found LSPs (primary LSPs, in this case) are indicated by bold solid-line arrows. Then, if the user right-clicks or the like on this arrow to choose "display related LSPs" from a menu, a table of the LSP state storage section 170 is searched for a secondary LSP corresponding to the arrow's LSP, and the path is indicated by a broken-line arrow. As for the search of the table, an item "type" of the entry number=1 of the primary LSP designated by the right click will be referred to first, and according to information "secondary=2" written in the item, LSP information of the entry number=2 will be searched for. Here again, when an arrow indicating each LSP is clicked, detailed information on the LSP (information on a path, name, state, or the like) may be displayed in a popup (e.g., in text). Alternatively, secondary LSPs may be searched for first so that those paths are displayed as arrows, and as a "related LSP" to an LSP chosen from the displayed secondary LSPs, a corresponding primary LSP may be found and displayed. As a further alternative presentation, LSPs may be grouped by type of primary/secondary to be displayed.

The primary LSP and the secondary LSP shown in FIG. 8 are an example of a global repair in which both of the LSPs are set up from the same start point R1 to the same end point R4. An example of a local repair will be described with reference to FIGS. 9 and 10. A local repair, for example, is as follows: as insurance against a case where the primary LSP (from R1 through R2 through R3 to R4) of FIG. 8 is disconnected between R2 and R3, a detour LSP is already set up between R2 and R3 in order to recover the LSP from R1 to R4 quickly.

Information on an LSP that uses a local repair is stored in the LSP state storage section 170 or LSP history storage section 185, for example, in the form shown in FIG. 9. In FIG. 9, items "local repair LSP" and "main LSP" are added to information stored in FIGS. 3 and 5. In order to create a table as FIG. 9, information on the LSP of entry number=1 is collected from the LSP's ingress router R1 first, the information indicating whether the LSP has a setup in which any local repair LSP can be used in case of trouble or not. Then, if the LSP has a setup for using a local repair, all intermediate routers on the path collected from the ingress router R1 are queried about whether there is a local repair LSP (detour LSP) for the LSP or not. In the example of FIG. 9, since it is found that the intermediate router R2 sets up a local repair LSP from R2 through R6 to R3 and that the intermediate router R3 sets up a local repair LSP from R3 through R5 to R4, new entries (entry numbers=4 and 5) are added severally and information on each LSP obtained from R2 and R3 is entered (entered as "local repair LSP" into the "type" field). But, if the same local repair LSP (identified by a combination of an LSP identifier and an ingress router) is already stored, no entry is added. Alternatively, if information on which intermediate router on a path has a local repair LSP can also be collected from an ingress router, information about a path of a local repair LSP may be collected by inquiring the specified intermediate router(s) included in the collected information.

Then, entry number=1 of the LSP that can use each local repair is entered into the "main LSP" field of each local repair LSP. Moreover, entry numbers=4 and 5 of the local repair LSPs are entered into the "local repair LSP" field of the LSP of entry number=1, with the entry numbers=4 and 5 being corresponded to ingress routers of the local repair LSPs, R2 and R3, respectively. In addition, since information on whether a local repair LSP is in use because of a trouble actually occurring on the original LSP (main LSP) or not is also collected from intermediate routers R2 and R3, information indicating "R2 is using the local repair LSP" is entered into the "other LSP information" field of the LSP of entry number=1. Therefore, by referring to this table stored in the LSP state storage section 170 or LSP history storage section 185, it can be found that the intermediate router R2 on the LSP of entry number=1 is using a local repair LSP, and that the local repair LSP in use is of entry number=4, which starts from R2. In this way, a path in which traffic actually is to flow can be traced.

Figure 10:
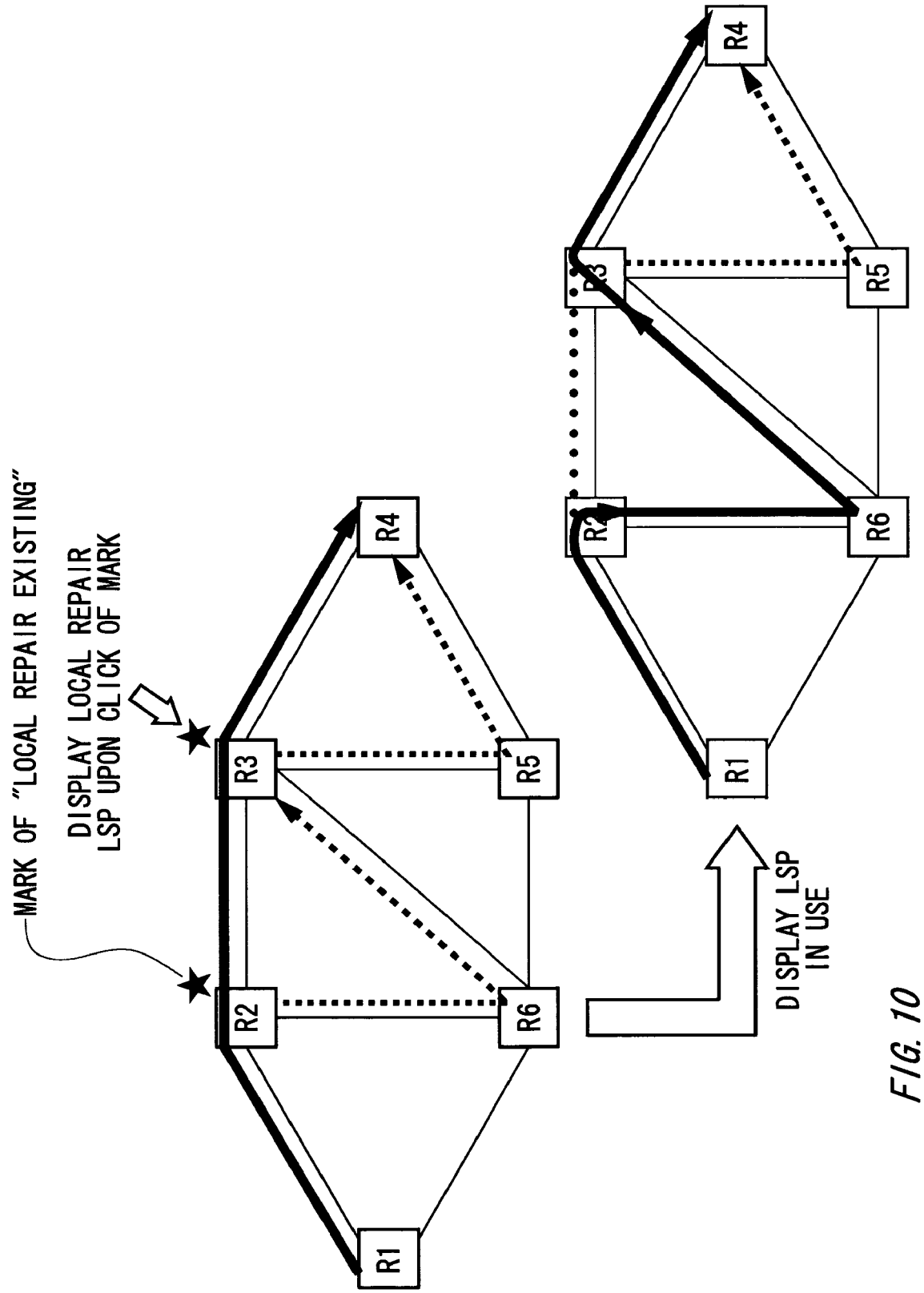
FIG. 10 shows an example of presentation of a local repair LSP by the user presentation information creation section 190.

Local repair information stored as FIG. 9 can be shown to a user, for example, as shown in FIG. 10. First, a static state (what local repair LSP is set up for which LSP) can be displayed as shown at the upper left display of FIG. 10. For example, when a user designates an LSP that starts from R1 and ends at R4, a found LSP is displayed first like a solid-line arrow shown at the upper left display of FIG. 10. At this time, if the found LSP has a setup for using a local repair (information is entered into the "local repair LSP" field), a mark indicating "local repair existing" is displayed at an ingress router of each local repair LSP. Then, if a user clicks or the like on this mark, a local repair LSP is displayed like a broken-line arrow shown at the upper left display of FIG. 10. Conversely, a local repair LSP can previously be indicated by a broken-line arrow, and when a user, for example, right-clicks or the like on this indication to choose "display the original LSP" from a menu, the original LSP can be indicated by a solid-line arrow.

Moreover, a dynamic state (which LSP is actually in use) can be displayed as shown at the lower right of FIG. 10. In the example of the lower right of FIG. 10, a local repair LSP in use (from R2 through R6 to R3) is indicated by a solid-line arrow, which is connected to sections other than the faulty section of the path of the original LSP, and the faulty section of the original LSP (between R2 and R3) is indicated by a circle-dotted line. However, when a local repair LSP is in use, it may be apparent that the section between its start point and end point is the faulty section of the original LSP. It may therefore be enough, for example, that an arrow for a local repair LSP in use is made to blink in the display shown at the upper left of FIG. 10.

Figure 12:
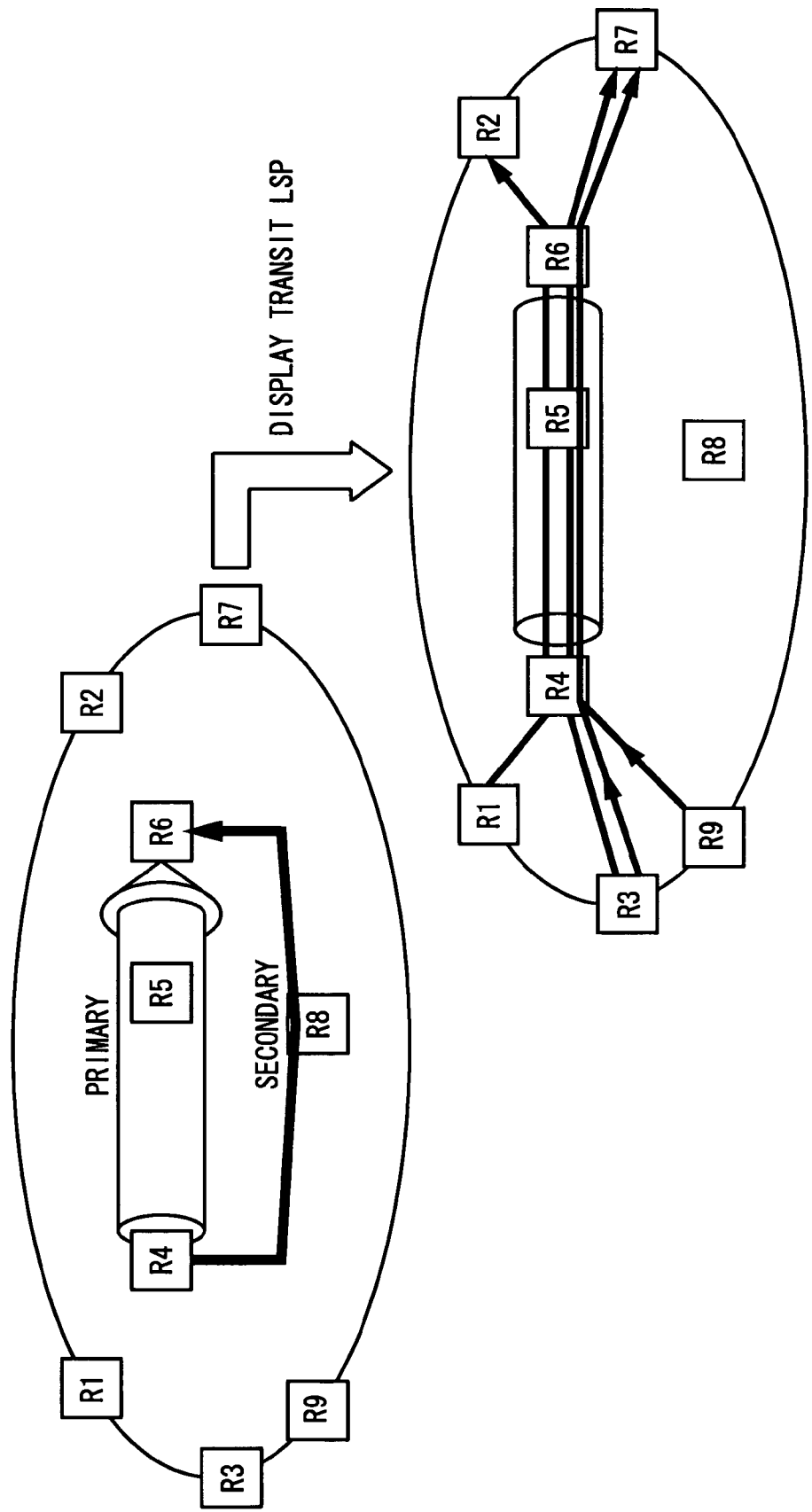
FIG. 12 shows an example of presentation of hierarchical LSPs by the user presentation information creation section 190.

FIGS. 11 and 12 illustrate visualization of a hierarchical LSP (label stack). As shown in these figures, a hierarchical LSP is an LSP in which a plurality of lower-level LSPs (entry number=3, 4, and 5) are set up so that they pass through a higher-level LSP (entry number=1) corresponding to a thick pipe. If a higher-level LSP is set up first and lower-level LSPs are set up in a way that uses the higher-level LSP like the above, exchange of setup messages become unnecessary as to routers in the setup section of the higher-level LSP when lower-level LSPs are set up, so it is convenient when many LSPs are to be set up. In this case, path information that an ingress router of a lower-level LSP maintains, as to a setup section of a higher-level LSP, includes information that identifies the higher-level LSP, but does not include information about intermediate routers on the path of the higher-level LSP.

Information on a hierarchical LSP is stored in the LSP state storage section 170 or LSP history storage section 185, for example, in the form shown in FIG. 11. In FIG. 11, an item "transit LSP" to enter a number of a lower-level LSP that is set up using the LSP is added to information stored in FIGS. 3 and 5. In order to create a table as FIG. 11, LSP information are collected from an ingress router of each LSP first. At this time, path information collected from an ingress router of a lower-level LSP includes information that specifies a higher-level LSP to use, in addition to labels to be given at intermediate routers. Since LSP information is collected also from an ingress router of a higher-level LSP concurrently with collection of LSP information of a lower-level LSP, information on a higher-level LSP is entered into the table as shown at entry number=1 in FIG. 11. When information on a lower-level LSP whose path information includes information that specifies another LSP (a higher-level LSP) is entered into the table, the information that specifies the higher-level LSP is converted into a corresponding entry number and then entered into the table.

For example, in a case of the LSP of entry number=3, path information includes three pieces of information, i.e. ingress router (IP address)=R4, egress router (IP address)=R6, and LSP identifier=500, as information that specifies a higher-level LSP. Since it can be seen by the monitoring apparatus 100 from the table of FIG. 11 that this higher-level LSP is the LSP of entry number=1, "LSP1" is entered into the "path (label)" field of the LSP of entry number=3, as information on the section between R4 and R5. Similarly, "LSP1" is entered into the path as to lower-level LSPs of entry numbers=4 and 5, so that "entry numbers=3, 4, and 5" are entered into the item "transit LSP" of the LSP of entry number=1.

In a case where information that specifies a higher-level LSP to use cannot be acquired from an ingress router, information will be collected as follows. For example, each intermediate router included in path information collected from an ingress router will be queried about whether it performs label switching using a higher-level LSP or not, and when the intermediate router uses a higher-level LSP, the intermediate router may send back information that specifies the LSP. Alternatively, in a case where a section between routers that are not actually adjacent to each other are found in path information collected from an ingress router when compared to information on network topology that is collected separately by a routing protocol or the like, information that specifies a higher-level LSP may be requested to a router from which the section starts.

When a lower-level LSP is deleted, information of the corresponding entry number in the LSP state storage section 170 is deleted. At the same time, an entry (entry of a higher-level LSP) in which the entry number is written in the "transit LSP" field is looked for, and the entry number entered there is deleted. For example, in FIG. 11, when the LSP of entry number=3 is deleted, the row of entry number=3 is deleted, and "3" in the "transit LSP" field of entry number=1 is deleted as well. When a higher-level LSP is deleted, information on a lower-level LSP that uses the higher-level LSP is also deleted, or changed to use another higher-level LSP. At this time, since change in a lower-level LSP is included in information collected from the ingress router or other routers of the lower-level LSP, the table of FIG. 11 can be updated according to the collected information.

Information on a hierarchical LSP stored as FIG. 11 can be shown to a user, for example, as shown in FIG. 12. Initial display is the same as the case of no label stack. For example, if a user designates an LSP that starts from R4 and ends at R6, LSPs that meet the requirement is searched for and those paths are indicated like the display shown at the upper left of FIG. 12. A correspondence between a primary and a secondary can be displayed as FIG. 8. In this example, the primary LSP from R4 to R6 is indicated by a column arrow since it is a higher-level LSP having "transit LSPs." Using a GUI menu, a user can instruct on this column arrow to display "transit LSPs," and in accordance with the instruction, each path of lower-level LSPs that are set up using the higher-level LSP is indicated like the display shown at the lower right of FIG. 12. Information on a lower-level LSP to be indicated can be obtained by reading from the table of FIG. 11 LSP information of an entry number stored as a "transit LSP" of the higher-level LSP instructed by the user. Alternatively, a user may designate an LSP that starts from R3 and ends at R7. In this case, an LSP that meets the requirement is searched for, and it is found that the found LSP is a lower-level LSP whose path information includes an LSP number. Therefore, the path of the lower-level LSP can be displayed while being indicated that it is a label stack, while a higher-level LSP relating to this LSP is displayed with a GUI menu. Though a two-level hierarchy case in which one or more lower-level LSPs pass through one higher-level LSP is mentioned in the above description, a label stack with a three-level hierarchy or more can also be visualized in a similar manner.

In the above description, an LSP that is set up by the RSVP and has one ingress router is visualized. A multipoint-to-point LSP and/or an LSP that is set up by the LDP can also be visualized in a similar manner. For example, a multipoint-topoint LSP that is set up by the LDP is stored in FIG. 11 as a lower-level LSP of entry number=5. In this case, ingress routers are not entered since there are more than one ingress routers (R3 and R9); an FEC value is entered for an LSP identifier; more than one pieces of path information (one from R3 and another from R9) are entered; and an LSP name is not defined. Path information on a multipoint-to-point LSP like this can be collected from each router on the path.

In the above-described configuration, along with an LSP, traffic flowing through the path may also be displayed. For this purpose, for example, information on traffic flowing through each LSP (the number of bytes, the number of packets, or the like) is collected from each ingress router by polling, for example, once every five minutes. Alternatively, traffic information is collected by using NetFlow (a technology of Cisco Systems, Inc.) or sFlow (a technology of InMon corporation), using a label as a key. Then, for example, when an LSP whose path is indicated as FIG. 6 is clicked, the traffic volume (unit: bps) through the LSP may be indicated. As an alternative, an LSP whose traffic volume is beyond a prescribed threshold may be indicated noticeably when displayed as FIG. 6.

By using the above-described configuration, for example, an ISP manager can grasp at a glance a current state of an LSP set up in a network as well as the path, and based on the information, the manager can appropriately manage many LSPs so that a service desired by customers of the ISP is provided. Moreover, since the above-described configuration allows a past state of an LSP to be easily searched for and investigated, analysis of past cases and future planning of a network through the analysis may also be realized.

Persons of ordinary skill in the art will realize that many modifications and variations of the above embodiments may be made without departing from the novel and advantageous features of the present invention. Accordingly, all such modifications and variations are intended to be included within the scope of the appended claims. The specification and examples are only exemplary. The following claims define the true scope and spirit of the invention.

What is claimed is:

1. An apparatus for monitoring a network in which a label switched path (LSP) is set up, the network including a plurality of routers, comprising:
a communication unit that communicates with a router among the plurality of routers;
a collection unit that collects LSP path information via the communication unit independently of packet forwarding that uses the LSP, the LSP path information being maintained by the router and including information to be referred to for forwarding a packet by the router and other information exchanged via a message for setting up or maintaining the LSP by the router;
a storing unit that stores state information based on the LSP path information collected by the collection unit, the state information including information for identifying an LSP and information on a current path of the LSP; and
a display unit that reads the state information for a selected LSP stored by the storing unit and graphically displays how a path of the selected LSP is formed on a corresponding network topology, in accordance with a user's instruction.

2. The apparatus according to claim 1, wherein
the information on the current path of the LSP includes at least one of ingress router information, egress router information, intermediate router information, and label information, each router being located on the current path.

3. The apparatus according to claim 1, wherein
the LSP path information and the state information include information on a current state of the LSP.

4. The apparatus according to claim 1, wherein
the collection unit receives a notification via the communication unit, the notification indicating a change in the LSP path information maintained by the router and being transmitted by the router.

5. The apparatus according to claim 1, wherein
the collection unit includes a unit that requests each of the plurality of routers on a regular basis to send LSP path information and receives the LSP path information in response to the request.

6. The apparatus according to claim 1, wherein
the storing unit further stores history information with time information, the history information being state information having been stored by the storing unit before,
and wherein
the display unit graphically displays a path of a selected LSP at a selected time in the past, based on the history information stored by the storing unit, in accordance with a user's instruction concerning the selected time.

7. The apparatus according to claim 1, wherein
the collection unit collects further information from an ingress router having a plurality of LSPs with different paths to an egress router, said further information indicating a correspondence between one of the plurality of LSPs of a first type and another of the plurality of LSPs of a second type;
the storing unit stores state information, whereby designating said one of the plurality of LSPs enables finding the state information for said another of the plurality of LSPs; and
the display unit searches the state information stored by the storing unit and graphically displays the different paths regarding the plurality of LSPs in association with each other.

8. The apparatus according to claim 1, wherein
the collection unit collects further information for specifying a main LSP, for which a detour LSP from one router to another router are ready to be used, said one router and said another router being on a path of the main LSP;
the storing unit stores state information, whereby designating one of the main LSP and the detour LSP enables finding the state information for another of the main LSP and the detour LSP; and
the display unit searches the state information stored by the storing unit and graphically displays a path of the main LSP and a path of the detour LSP in association with each other.

9. The apparatus according to claim 1, wherein
the collection unit collects further information for specifying a higher-level LSP used by a lower-level LSP from an ingress router to an egress router, the higher-level LSP being established between routers on a path of the lower-level LSP;
the storing unit stores state information, whereby designating one of the higher-level LSP and the lower-level LSP enables finding the state information for another of the higher-level LSP and the lower-level LSP; and
the display unit searches the state information stored by the storing unit and graphically displays a path of the higher-level LSP and a path of the lower-level LSP in association with each other.

10. The apparatus according to claim 1, wherein
the collection unit collects LSP path information for an LSP, from an ingress router of the LSP, the apparatus further comprising:
a second collection unit that collects further information for the LSP, from each router on a path of the LSP, via the communication unit; and
a unit that determines information on a current path of the LSP to be stored by the storing unit, through correcting the LSP path information collected by the collection unit based on said further information collected by the second collection unit.

11. The apparatus according to claim 1, further comprising
a traffic information collection unit that collects further information indicating traffic forwarded through an LSP, from a router, via the communication unit,
and wherein
the display unit graphically displays the traffic of a selected LSP in association with the path of the selected LSP.

12. The apparatus for monitoring a network according to claim 1, wherein
the other information exchanged via the message for setting up or maintaining the LSP by the router is different from the information to be referred to for forwarding the packet by the router.

13. A method of monitoring a network in which a label switched path (LSP) can be set up, the network including a plurality of routers, comprising:
collecting LSP path information through communicating with a router among the plurality of routers independently of packet forwarding that uses the LSP, the LSP path information being maintained by the router and including information to be referred to for forwarding a packet by the router and other information exchanged via a message for setting up or maintaining the LSP by the router;
storing state information in a memory based on the LSP path information collected, the state information including information for identifying an LSP and information on a current path of the LSP; and
reading the state information for a selected LSP from the memory to graphically display how a path of the selected LSP is formed on a corresponding network topology, in accordance with a user's instruction.

14. The method of claim 13, wherein
more than one LSPs with different paths are set up from an ingress router to an egress router in the network;
the LSP path information includes information indicating a correspondence between one of said more than one LSPs and another of said more than one LSPs; and
the state information for said one of said more than one LSPs is read for a graphical display in accordance with the user's instruction, when said another of said more than one LSPs is designated.

15. The method of claim 13, wherein
a detour LSP from one router to another router is set up in the network, said one router and said another router being on a path of a main LSP;
the LSP path information includes information indicating a correspondence between the detour LSP and the main LSP, the main LSP being able to use the detour LSP; and
the state information for one of the main LSP and the detour LSP is read for a graphical display in accordance with the user's instruction, when another of the main LSP and the detour LSP is designated.

16. The method of claim 13, wherein
a lower-level LSP from an ingress router to an egress router is set up using a higher-level LSP in the network, the higher-level LSP being established between routers on a path of the lower-level LSP;
the LSP path information includes information for specifying the higher-level LSP used by the lower-level LSP; and
the state information for one of the higher-level LSP and the lower-level LSP is read for a graphical display in accordance with the user's instruction, when another of the higher-level LSP and the lower-level LSP is designated.

17. The method of claim 13, wherein
the LSP path information for an LSP is collected from an ingress router of the LSP,
the method further comprising:
collecting another LSP path information for the LSP, from each router on a path of the LSP; and
determining information on a current path of the LSP to be stored, by correcting the LSP path information based on said another LSP path information.

18. A system for monitoring a network in which a label switched path (LSP) is set up, comprising:
a plurality of routers included in the network; and
a monitoring apparatus configured to communicate with the plurality of routers,
wherein
each of the plurality of routers includes:
a storing unit that stores LSP path information including information to be referred to for forwarding a packet using an LSP and other information exchanged via a message for setting up or maintaining the LSP; and
a transmitting unit that transmits information stored by the storing unit to the monitoring apparatus,
and
the monitoring apparatus includes:
a receiving unit that receives information transmitted by said each of the plurality of routers independently of packet forwarding that uses the LSP;
a storing unit that stores state information based on the information received by the receiving unit, the state information including information for identifying an LSP and information on a current path of the LSP; and
a display unit that reads the state information for a selected LSP stored by the storing unit and graphically displays how a path of the selected LSP is formed on a corresponding network topology, in accordance with a user's instruction.

19. The system according to claim 18, wherein
the transmitting unit of said each of the plurality of routers transmits a notification including updated information, responsive to a change in the LSP path information stored by the storing unit of said each of the plurality of routers.

20. The system according to claim 18, wherein
the monitoring apparatus further includes a collection unit that requests said each of the plurality of routers on a regular basis to transmit information stored by the storing unit of said each of the plurality of routers, the receiving unit receiving the information transmitted by said each of the plurality of routers in response to the request.

21. A computer usable medium having computer readable program codes embodied therein for a computer functioning as a monitoring apparatus connected with a network in which a label switched path (LSP) is set up, the network including a plurality of routers, the computer readable program codes comprising:
a communication code module causing the computer to communicate with a router among the plurality of routers;

a collection code module causing the computer to collect LSP path information via the communication code module independently of packet forwarding that uses the LSP, the LSP path information being maintained by the router and including information to be referred to for forwarding a packet by the router and other information exchanged via a message for setting up or maintaining the LSP;

a storing code module causing the computer to store state information based on the LSP path information collected by the collection code module, the state information including information for identifying an LSP and information on a current path of the LSP; and a display code module causing the computer to read the state information for a selected LSP stored by the storing code module and to graphically display how a path of the selected LSP is formed on a corresponding network topology, in accordance with a user's instruction.

* * * * *